(12) United States Patent
Neal et al.

(10) Patent No.: US 7,019,422 B2
(45) Date of Patent: Mar. 28, 2006

(54) MOTOR WITH STATOR MADE FROM LINEAR CORE PREFORM

(75) Inventors: Griffith D. Neal, Alameda, CA (US); Albert D. Neal, Long Beach, IN (US)

(73) Assignee: Encap Motor Corporation, Alameda, CA (US)

( * ) Notice: Subject to any disclaimer, the term of this patent is extended or adjusted under 35 U.S.C. 154(b) by 0 days.

(21) Appl. No.: 10/970,575

(22) Filed: Oct. 20, 2004

(65) Prior Publication Data

US 2005/0082919 A1   Apr. 21, 2005

Related U.S. Application Data

(62) Division of application No. 09/775,242, filed on Feb. 1, 2001.

(51) Int. Cl.
*H02K 1/04* (2006.01)

(52) U.S. Cl. .......................................... 310/43; 310/179
(58) Field of Classification Search .................. 310/43, 310/179, 216, 254
See application file for complete search history.

(56) References Cited

U.S. PATENT DOCUMENTS

| | | | | |
|---|---|---|---|---|
| 4,350,914 A | * | 9/1982 | Searle | 310/194 |
| 5,204,044 A | * | 4/1993 | Yoneshige | 264/272.15 |
| 5,459,190 A | * | 10/1995 | Nakamura et al. | 524/443 |
| 5,554,902 A | * | 9/1996 | Kessens et al. | 310/254 |
| 5,659,217 A | * | 8/1997 | Petersen | 310/156.26 |
| 5,774,974 A | * | 7/1998 | Dunfield et al. | 29/596 |
| 6,060,810 A | * | 5/2000 | Lee et al. | 310/254 |
| 6,081,059 A | * | 6/2000 | Hsu | 310/179 |
| 6,369,687 B1 | * | 4/2002 | Akita et al. | 336/234 |
| 6,459,190 B1 | * | 10/2002 | Johansson et al. | 310/323.16 |
| 6,476,533 B1 | * | 11/2002 | Akutsu et al. | 310/259 |
| 6,583,530 B1 | * | 6/2003 | Hsu | 310/254 |
| 6,856,065 B1 | * | 2/2005 | Suzuki et al. | 310/218 |

* cited by examiner

*Primary Examiner*—Joseph Waks
(74) *Attorney, Agent, or Firm*—Steven P. Shurtz; Brinks Hofer Gilson & Lione

(57) ABSTRACT

A motor includes a stator having multiple conductors that create a plurality of magnetic fields when electrical current is conducted through the conductors. The stator has a pair of opposing end surfaces in contact with each other forming a toroidal core. A monolithic body of phase change material substantially encapsulates the conductors and holds said toroidal core in place. The stator is formed by laminating strips together to form a linear core preform, winding wire around poles extending from a side of the core preform, then rolling the preform to bring its two ends together to form the toroidal core. Hard disc drives using the motor, and methods of constructing the motor and hard disc drives are also disclosed.

19 Claims, 7 Drawing Sheets

MOTOR WITH STATOR MADE FROM LINEAR CORE PREFORM

REFERENCE TO EARLIER FILED APPLICATION

The present application is a divisional of U.S. patent application Ser. No. 09/775,242, filed Feb. 1, 2001, which is hereby incorporated by reference.

FIELD OF THE INVENTION

The present invention relates generally to a motor. It relates particularly to a spindle motor such as used in a hard disc drive, and to the construction of the stator for the motor.

BACKGROUND OF THE INVENTION

Computers commonly use disc drives for memory storage purposes. Disc drives include a stack of one or more magnetic discs that rotate and are accessed using a head or read-write transducer. Typically, a high speed motor such as a spindle motor is used to rotate the discs.

In conventional spindle motors, stators have been made by laminating together stamped pieces of steel. These stamped pieces of steel are generally circular in nature, but also have "poles" extending either inwardly or outwardly, depending on whether the rotor is on the inside or surrounds the stator. The stamped pieces are laminated together and then coated with insulation. Wire is then wound around the poles to form stator windings.

An example of a conventional spindle motor 1 is shown in FIG. 1. The motor 1 includes a base 2 which is usually made from die cast aluminum, a stator 4, a shaft 6, bearings 7 and a disc support member 8, also referred to as a hub. A magnet 3 and flux return ring 5 are attached to the disc support member 8. The stator 4 is separated from the base 2 using an insulator (not shown) and attached to the base 2 using a glue. Distinct structures are formed in the base 2 and the disc support member 8 to accommodate the bearings 7. One end of the shaft 6 is inserted into the bearing 7 positioned in the base 2 and the other end of the shaft 6 is placed in the bearing 7 located in the hub 8. A separate electrical connector 9 may also be inserted into the base 2.

Each of these parts must be fixed at predefined tolerances with respect to one another. Accuracy in these tolerances can significantly enhance motor performance.

In operation, the disc stack is placed upon the hub. The stator windings are selectively energized and interact with the permanent magnet to cause a defined rotation of the hub. As hub 8 rotates, the head engages in reading or writing activities based upon instructions from the CPU in the computer.

Manufacturers of disc drives are constantly seeking to improve the speed with which data can be accessed. To an extent, this speed depends upon the efficiency of the spindle motor, as existing magneto-resistive head technology is capable of accessing data at a rate greater than the speed offered by the highest speed spindle motor currently in production. The efficiency of the spindle motor is dependent upon the dimensional consistency or tolerances between the various components of the motor. Greater dimensional consistency between components leads to a smaller gap between the stator 4 and the magnet 3, producing more force, which provides more torque and enables faster acceleration and higher rotational speeds.

The conventional method of forming stators has a number of drawbacks. First, most steel is manufactured in rolled sheets and thus has a grain orientation. The grain orientation has an effect on the magnetic flux properties of the steel. In circular stamped pieces of steel, the grain orientation at different points around the circle differs. Compared from the radius line of the circle, the grain orientation is sometimes aligned along the radius, sometimes transverse to it, and mostly at a varying angle to the radius. The un-aligned grain structure of conventional stators causes the magnetic flux values to differ in parts of the stator and thus the motor does not have consistent and uniform torque properties as it rotates.

Another drawback with using circular steel pieces is that, especially for inward facing poles, it has been difficult to wind the wire windings tightly because of the cramped space to work inside of the laminated stator body. The cramped working space creates a lower limit on the size of the stator and thus the motor. The limited working space also results in a low packing density of wire. The packing density of wire coiled around the poles affects the amount of power generated by the motor. Increasing packing density increases the power and thus the efficiency of the spindle motor.

An important factor in motor design is to reduce stack up tolerances in the motor. Stack up tolerances reduce the overall dimensional consistency between the components. Stack up tolerances refer to the sum of the variation of all the tolerances of all the parts, as well as the overall tolerance that relates to the alignment of the parts relative to one another. One source of stack up tolerances is from the circular stator body. Generally, the thickness of rolled sheet steel is not uniform across the width of the sheet. Sometimes the edges are thicker or thinner than the center. In a stator made from circular stamped pieces, the thickness of individual laminations are thus different from one side to the other. When stacked together, this creates a stack up tolerance problem. Furthermore, the circular stampings leave a lot of wasted steel that is removed and must be recycled or discarded.

Another important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arhennius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation reducing bearing life. This non-uniform rotation causes a further problem of limiting the ability of the servo system controlling the read/write heads to follow the data tracks on the magnetic media. One drawback with existing motor designs is their limited effective dissipation of the heat, and difficulty in incorporating heat sinks to aid in heat dissipation. In addition, in current motors the operating temperatures generally increase as the size of the motor is decreased.

Manufacturers have established strict requirements on the outgassing of materials that are used inside a hard disc drive. These requirements are intended to reduce the emission of materials onto the magnetic media or heads during the operation of the drive. Of primary concern are glues used to attach components together, varnish used to insulate wire, and epoxy used to protect steel laminations from oxidation.

In addition to such outgassed materials, airborne particulate in a drive may lead to head damage. Also, airborne particulates in the disc drive could interfere with signal transfer between the read/write head and the media. To reduce the effects of potential airborne particulate, hard drives are manufactured to exacting clean room standards and air filters are installed inside of the drive to reduce the contamination levels during operation.

One example of a spindle motor is shown in U.S. Pat. No. 5,694,268 (Dunfield et al.) (incorporated herein by reference). Referring to FIGS. 7 and 8 of this patent, a stator 200 of the spindle motor is encapsulated with an overmold 209. The overmolded stator contains openings through which mounting pins 242 may be inserted for attaching the stator 200 to a base. U.S. Pat. No. 5,672,972 (Viskochil) (incorporated herein by reference) also discloses a spindle motor having an overmolded stator. One drawback with the overmold used in these patents is that it has a different coefficient of linear thermal expansion ("CLTE") than the corresponding metal parts to which it is attached. Another drawback with the overmold is that it is not very effective at dissipating heat. Further, the overmolds shown in these patents are not effective in damping some vibrations generated by energizing the stator windings.

U.S. Pat. No. 5,806,169 (Trago) (incorporated herein by reference) discloses a method of fabricating an injection molded motor assembly. However, the motor disclosed in Trago is a step motor, not a high speed spindle motor, and would not be used in applications such as hard disc drives. Furthermore, none of these three prior art designs address the problem of variations in the thickness of steel used to make stator cores and the non-uniform grain structure in the steel compared to the magnet flux in the stator during operation of the motor. Thus, a need exists for an improved high speed spindle motor, having properties that will be especially useful in a hard disc drive, overcoming the aforementioned problems.

BRIEF SUMMARY OF THE INVENTION

A high speed motor has been invented which overcomes many of the foregoing problems. In addition, unique stator assemblies and other components of a high speed motor have been invented, as well as methods of manufacturing motors and hard disc drives. In one aspect, the invention is a stator assembly that includes a stator having multiple conductors that create a plurality of magnetic fields when electrical current is conducted through the conductors and a core having a pair of opposing end surfaces in contact with each other forming a toroidal shape; and a monolithic body of phase change material substantially encapsulating the conductors and the core and holding said core in a toroidal shape.

In another aspect, the invention is a method of making a motor comprising: providing a linear stator core preform, wherein said core preform has a first end surface and a second end surface and poles extending along one side thereof; winding wire around said poles; forming a toroidal core by bringing the first end surface and the second end surface into contact with each other; and substantially encapsulating said toroidal core stator with a monolithic body of phase change material.

In another aspect, the invention is a method of making a stator assembly for a motor that includes the steps of providing a linear core preform, having a first end surface and a second end surface and poles extending along one side thereof; winding wire around said poles; forming a toroidal core by bringing the first end surface and the second end surface into contact with each other; and substantially encapsulating said toroidal core and windings with a monolithic body of phase change material to form the stator assembly.

In yet another aspect, the invention is a method of making a motor that includes the steps of providing a linear core preform having two end surfaces and a plurality of poles extending from one side; winding wire around the poles; forming a toroidal core by bringing the two end surfaces of the core preform adjacent to each other; clamping the toroidal core in an injection mold cavity to hold the toroidal shape; injection molding phase change material around said toroidal core to substantially encapsulate said toroidal core with a monolithic body of phase change material to form a stator assembly; and constructing the stator assembly into a motor.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and-equivalents thereof.

DETAILED DESCRIPTION OF THE DRAWINGS AND PREFERRED EMBODIMENTS OF THE INVENTION

A preferred embodiment of a high speed motor of the present invention and portions of the motor at different stages of manufacture are shown in FIGS. 2–7. By "high speed" it is meant that the motor can operate at over 5,000 rpm. The spindle motor 100 is designed for rotating a disc or stack of discs in a computer hard drive. Motor 100 is formed by using an injection molded stator assembly 40, that is formed by injection molding a linear stator core preform 20 aligned to form a toroidal core 17. Although the embodiment described here uses a flat linear stator core preform 20, one of ordinary skill in the art will understand that the stator core preform does not initially have to be flat, and may have some curvature. The motor of a preferred embodiment of the invention is smaller, has a grain structure that is uniformly aligned, allows for greater packing density of wire and reduces waste of steel in the manufacturing process as compared with conventional motors used for disc drives, thereby increasing power and reducing stack up tolerances and manufacturing costs and producing other advantages discussed below.

Figure 1:
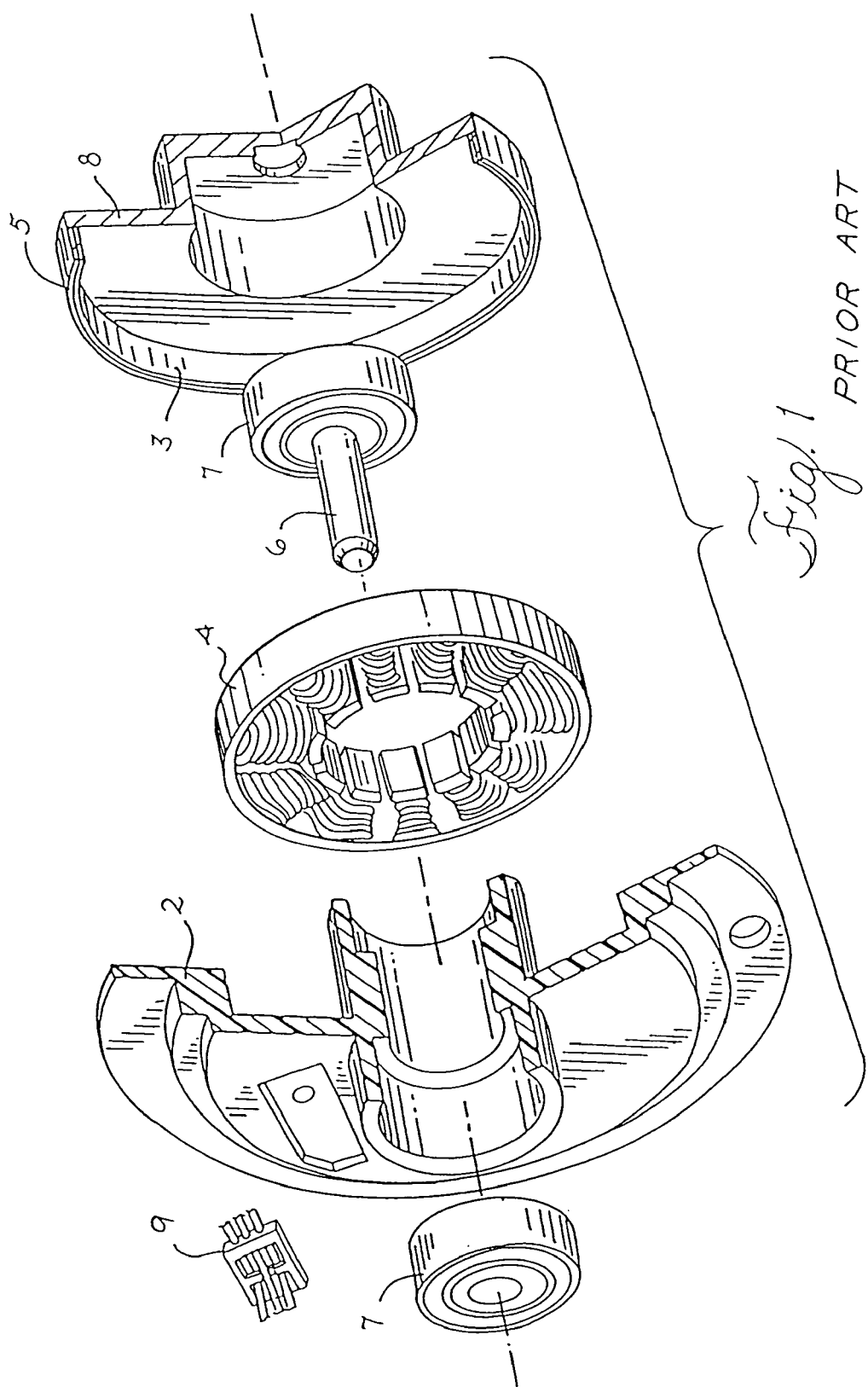
FIG. 1 is an exploded, partial cross-sectional and perspective view of a conventional high speed motor.
Figure 2:
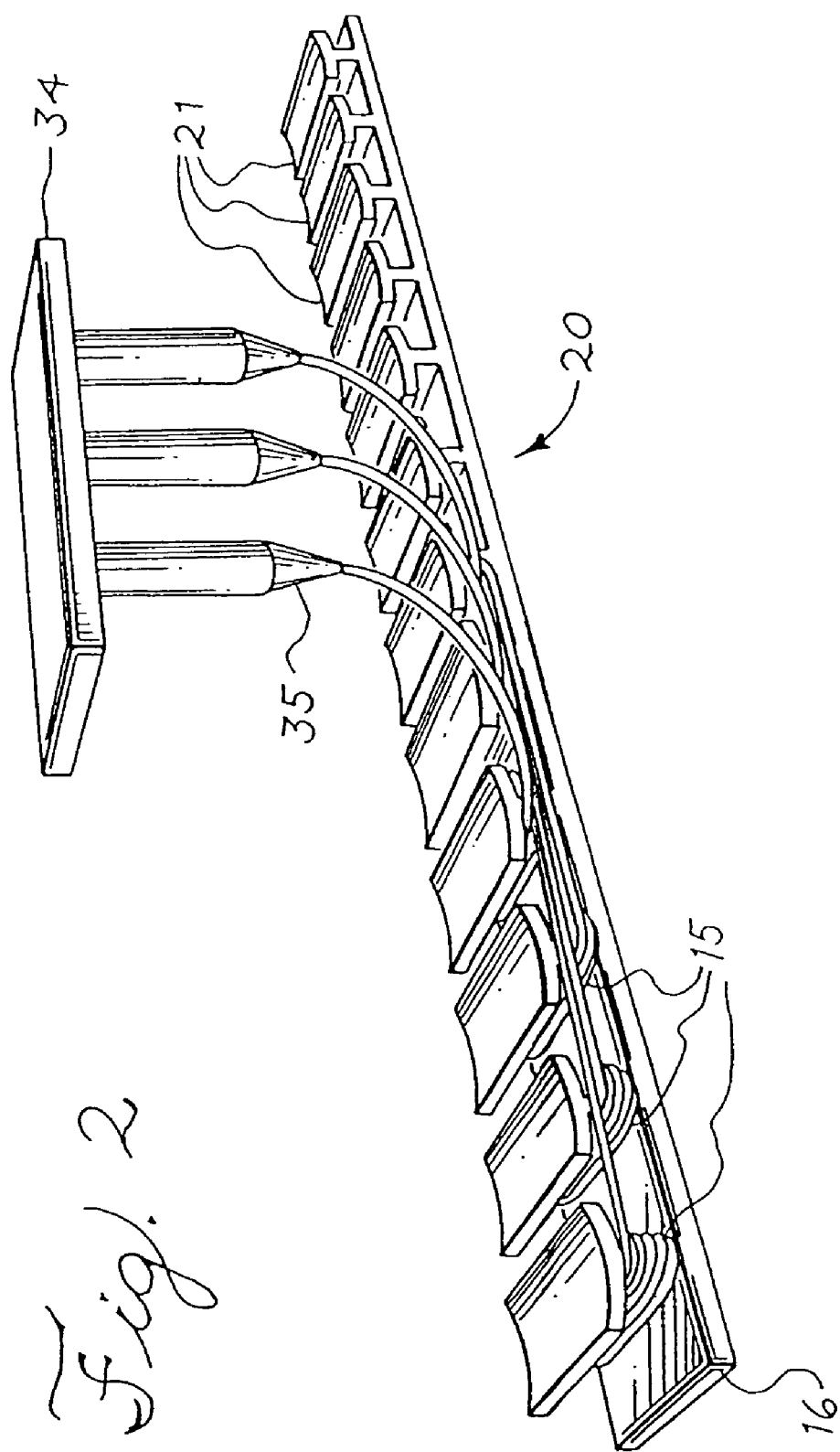
FIG. 2 is a perspective view of a core preform.
Figure 3:
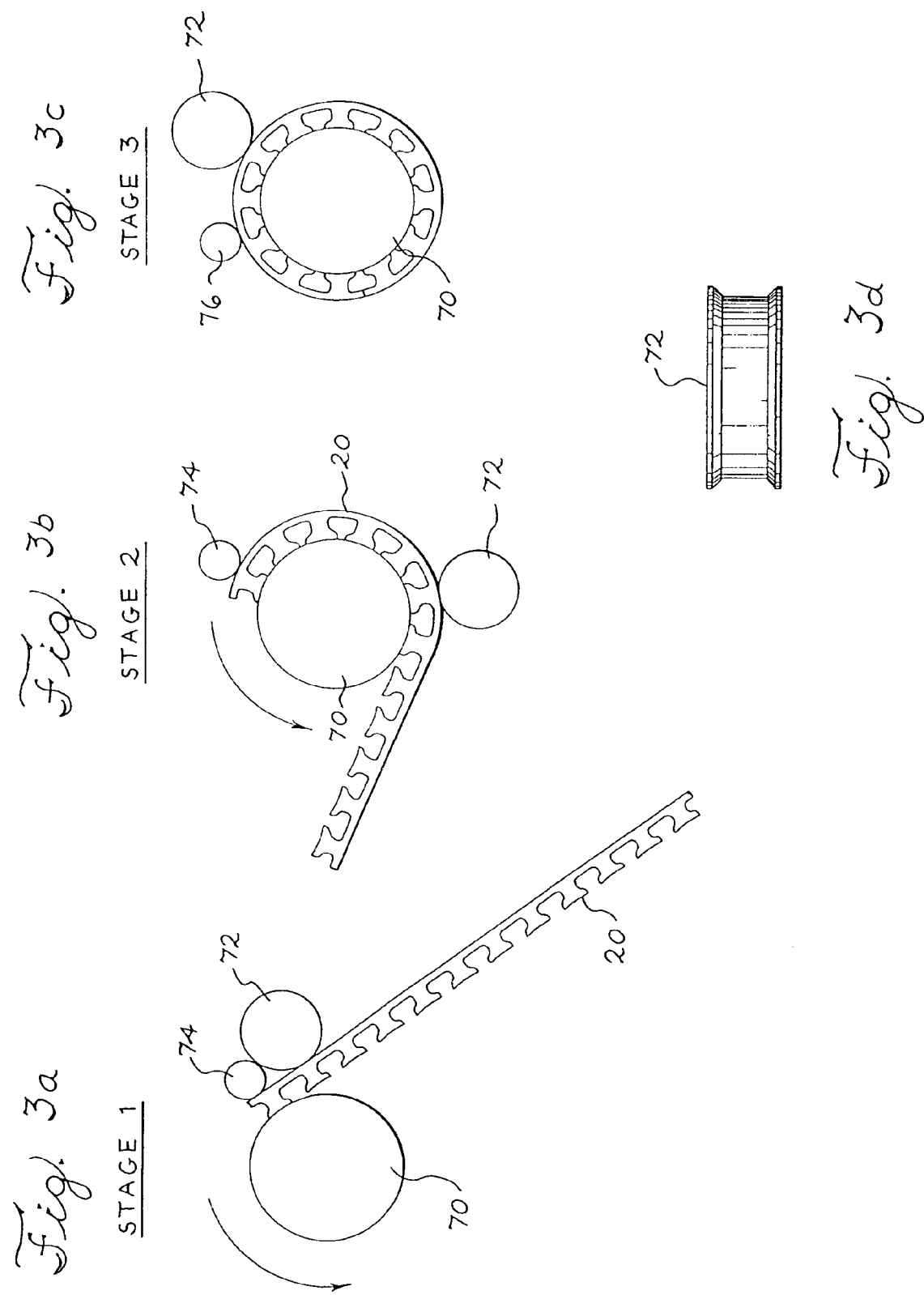
FIG. 3a is a cross-sectional view of a stator core preform of FIG. 2 during a first stage of the rolling process.
FIG. 3b is a cross-sectional view of a partially-rolled stator core preform of FIG. 3a during a second stage of the rolling process.
FIG. 3c is a cross-sectional view of a substantially-rolled stator core preform of FIG. 3b during a third stage of the rolling process.
FIG. 3d is a perspective-side view of a mandrel used in the rolling process in FIGS. 3a–3c.

Referring to FIG. 2, a linear stator core preform 20 is first constructed, using steel laminations (not shown). The stator core preform 20 comprises of steel pieces that are stamped out of a rolled steel. The stamped steel pieces are linear and flat, but also have poles 21 extending inwardly or outwardly depending on whether the rotor is inside or surrounds the stator. In the embodiment shown in FIG. 2, the poles 21 are shown extending inwardly. The stamped pieces are then coated with epoxy which provides insulation and laminates the pieces together to form a stator core preform 20. The stator core preform also has two end surfaces 16, 19.

As shown in FIG. 2, wire 15 is then wound around the poles 21 of the stator core preform 20 using a spool winder 34. The spool winder 34 has a set of needles 35 that make it easier to wind wire around the poles 21. The wire 15 is wound around one pole 21 and is then wound around another pole 21 in its phase until all poles 21 in the same phase are wound with the same wire 15. Poles in other phases are also similarly wound. Using this method, a wire packing density of about 60 percent to about 80 percent can be achieved.

As shown in FIGS. 3a–3c, the stator piece is then rolled using a rolling apparatus. A preferred rolling apparatus is a diacro roll form machine. FIGS. 3a–3c show the positions of the stator core preform and the rolling apparatus at various stages in the rolling process. The rolling apparatus has a mandrel 70, wheel 72 and pins 74 and 76. The mandrel 70 is circular and has a diameter that is equal to the inner diameter (D in FIG. 5) of toroidal core 17. As shown in FIG. 3d, the wheel 72 is circular and has flanges 75 that hold the side edges of the stator piece in place and prevent spiraling of the stator piece during rolling. For rolling, the linear stator core preform 20 is positioned in the rolling apparatus so that the poles 21 face mandrel 70, as illustrated in FIG. 3a. Wheel 72 then rolls around the circumference of mandrel 70, as illustrated in FIG. 3b. As wheel 72 rolls, the core preform is also rolled and is held in place with the mandrel 70 by the wheel 72 and pins 74, 76. When the wheel 72 substantially circumscribes the mandrel 70 and approaches pin 74, pin 74 is removed and pin 76 holds the stator piece in contact with mandrel 70 at a position behind wheel 72, as shown in FIG. 3c. Wheel 72 then rolls further to fully circumscribe the mandrel 70 and complete the rolling process.

Figure 4:
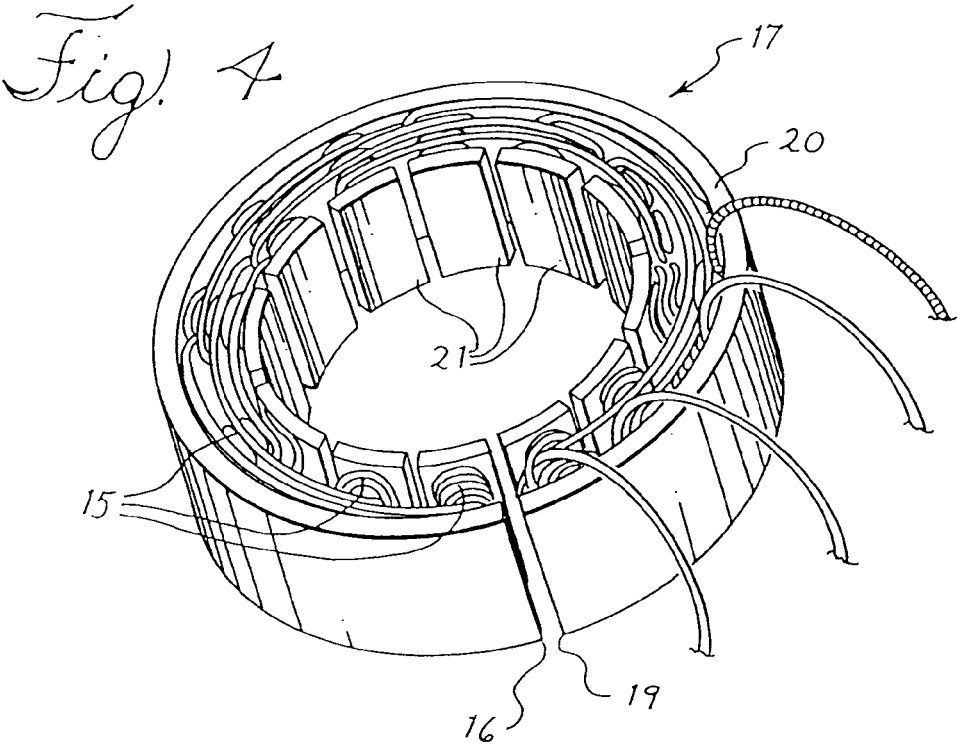
FIG. 4 is a perspective view of a rolled stator core preform of FIG. 3c forming a toroidal core.

As shown in FIG. 4, the end surfaces 16, 19 of the rolled preform stator 20 are aligned to form a magnetically inducible toroidal core 17 having a plurality of poles 21 thereon, and wire windings 15 which serve as conductors. To form the toroidal core, end surface 16 of the stator core preform 20 is aligned and brought into contact with end surface 19 by placing and clamping the stator core preform 20 in an injection mold cavity. The toroidal core is shaped like a toroid and has a rectangular vertical cross-section. The wire 15 between the poles 21 is also aligned in the toroidal core 17, following the curvature of the toroidal core 17. As a result, the wire 15 in the toroidal core 17 is taught. The wire is wound so that one set of three leads is terminated together to create the common, and the other end of the stator has three phases. The conductors induce or otherwise create a plurality of magnetic fields in the core when electrical current is conducted through the conductors. In this embodiment, a magnetic field is induced in each of the poles 21.

Figure 5:
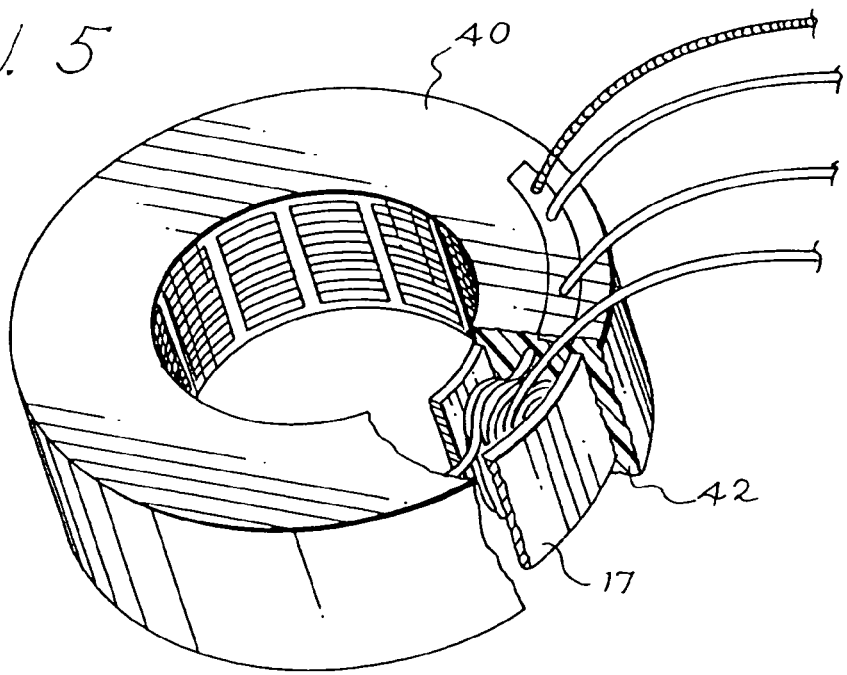
FIG. 5 is a perspective view of an encapsulated stator using the toroidal core of FIG. 4.

As shown in FIG. 5, the toroidal core 17 is then encapsulated in a body 42. Together the toroidal core 17 and the body 42 make up a stator assembly 40. The body 42 is preferably a monolithic body. Monolithic is defined as being formed as a single piece. The body 42 substantially encapsulates the toroidal core 17. Substantial encapsulation means that the body either entirely surrounds the toroidal core 17, or surrounds almost all of it except for minor areas of the stator that may be exposed. However, substantial encapsulation means that the body 42 and toroidal core 17 are rigidly fixed together, and behave as a single component with respect to harmonic oscillation vibration.

The body 42 is preferably formed of a phase change material, meaning a material that can be used in a liquid phase to envelope the stator, but which later changes to a solid phase. There are two types of phase change materials that will be most useful in practicing the invention: temperature activated and chemically activated. A temperature activated phase change material will become molten at a higher temperature, and then solidify at a lower temperature. However, in order to be practical, the phase change material must be molten at a temperature that is low enough that it can be used to ecapsulate a toroidal core. Preferred temperature activation of phase change materials will be changed from a liquid to a solid in the range of about 200° F. to about 700° F., more preferably in the range of about 550° F. to about 650° F. The most preferred temperature activated phase change materials are thermoplastics. The preferred thermoplastic will become molten at a temperature at which it is injection-moldable, and then will be solid at normal operating temperatures for the motor. An example of a phase change material that changes phases due to a chemical reaction, and which could be used to form the body, is an epoxy. Other suitable phase change materials may be classified as thermosetting materials.

The method of developing the monolithic body 42 comprises designing a phase change material to have a coefficient of linear thermal expansion such that the phase change material contracts and expands at approximately the same rate as the metal laminations of the toroidal core 17. For example, the preferred phase change material should have a CLTE of between 70% and 130% of the CLTE of the core of the stator. The phase change material should have a CLTE that is intermediate the maximum and minimum CLTE of the toroidal core where the body is in contact with different materials. Also, the CLTE's of the body and toroidal core should match throughout the temperature range of the motor during its operation. An advantage of this method is that a more accurate tolerance may be achieved between the body and the components of the toroidal core because the CLTE of the body matches the CLTE of the toroidal core components more closely. Most often the toroidal core components will be metal, and most frequently steel and copper. Other motor parts are often made of aluminum or steel.

Most thermoplastic materials have a relatively high CLTE. Some thermoplastic materials may have a CLTE at low temperatures that is similar to the CLTE of metal. However, at higher temperatures the CLTE does not match that of the metal. A preferred thermoplastic material will have a CLTE of less than $2 \times 10^{-5}$ in/in° F., more preferably less than $1.5 \times 10^{-5}$ in/in° F., throughout the expected operating temperature of the motor, and preferably throughout the range of 0–250° F. Most preferably, the CLTE will be between about $0.8 \times 10^{-5}$ in/in° F. and about $1.2 \times 10^{-5}$ in/in° F. throughout the range of 0–250° F. (When the measured CLTE of a material depends on the direction of measurement, the relevant CLTE for purposes of defining the present invention is the CLTE in the direction in which the CLTE is lowest.)

The CLTE of common solid parts used in a motor are as follows:

|  | 23° C. | 250° F. |
| --- | --- | --- |
| Steel | 0.5 | 0.8 ($\times 10^{-5}$ in/in° F.) |
| Aluminum | 0.8 | 1.4 |
| Ceramic | 0.3 | 0.4 |

Of course, if the motor is designed with two or more different solids, such as steel and aluminum components, the CLTE of the phase change material would preferably be one that was intermediate, the maximum CLTE and the minimum CLTE of the different solids, such as 0.65 in/in° F. at room temperature and $1.1 \times 10^{-5}$ in/in° F. at 250° F.

One preferred thermoplastic material, Konduit OTF-212-11 (which has a tensile strength of 7,600 when measured under ASTM method D638), was made into a thermoplastic body and tested for its coefficient of linear thermal expansion by a standard ASTM test method. It was found to have a CLTE in the range of −30 to 30° C. of $1.09 \times 10^{-5}$ in/in° F. in the X direction and $1.26 \times 10^{-5}$ in/in° F. in both the Y and Z directions, and a CLTE in the range of 100 to 240° C. of $1.28 \times 10^{-5}$ in/in° F. in the X direction and $3.16 \times 10^{-5}$ in/in° F. in both the Y and Z directions. (Hence, the relevant CLTEs for purposes of defining the invention are $1.09 \times 10^{-5}$ in/in° F. and $1.28 \times 10^{-5}$ in/in° F.) Another similar material, Konduit PDX -0-988, was found to have a CLTE in the range of −30 to 30° C. of $1.1 \times 10^{-5}$ in/in° F. in the X direction and $1.46 \times 10^{-5}$ in/in° F. in both the Y and Z directions, and a CLTE in the range of 100 to 240° C. of $1.16 \times 10^{-5}$ in/in° F. in the X direction and $3.4 \times 10^{-5}$ in/in° F. in both the Y and Z directions. By contrast, a PPS type polymer, (Fortron 4665) was likewise tested. While it had a low CLTE in the range of −30 to 30° C. ($1.05 \times 10^{-5}$ in/in° F. in the X direction and $1.33 \times 10^{-5}$ in/in° F. in both the Y and Z directions), it had a much higher CLTE in the range of 100 to 240° C. ($1.94 \times 10^{-5}$ in/in° F. in the X direction and $4.17 \times 10^{-5}$ in/in° F. in both the Y and Z directions).

In addition to having a desirable CLTE, the preferred phase change material will also have a high thermal conductivity. A preferred thermoplastic material will have a thermal conductivity of at least 0.7 watts/meter° K. using ASTM test procedure 0149 and tested at room temperature (23° C.).

Stator assemblies with a body of phase change material partially encapsulating the stator wherein the stator core is made as described above are themselves novel and define another aspect of the present invention.

In the present embodiment, the phase change material used to make the body 42 is preferably a thermally conductive but non-electrically conductive plastic. In addition, the plastic preferably includes ceramic filler particles that enhance the thermal conductivity, while reducing the coefficient of linear thermal expansion of the plastic. A preferred form of plastic is polyphenyl sulfide (PPS) sold under the tradename "Konduit" by LNP. Grade OTF-212 PPS is particularly preferred. Examples of other suitable thermoplastic resins include, but are not limited to, thermoplastic resins such as 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

Figure 6A:
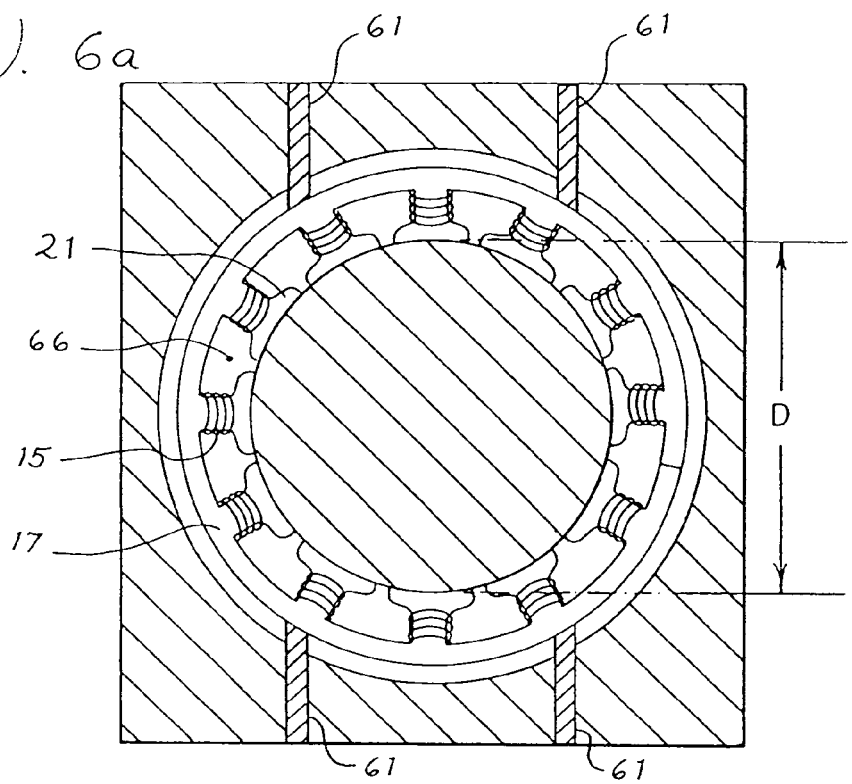
FIG. 6a is a cross-sectional view of the toroidal core of FIG. 4 in an injection mold assembly, prior to injecting a phase change material.
Figure 6B:
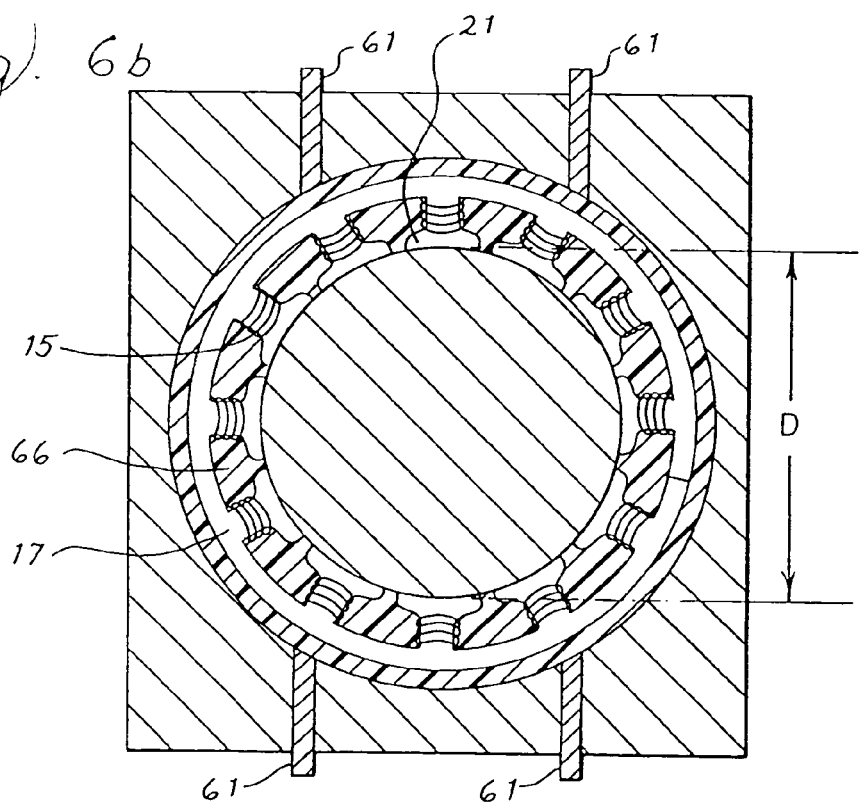
FIG. 6b is a cross-sectional view of the toroidal core of FIG. 4 in an injection mold assembly, after injecting a phase change material.

As shown in FIG. 6a, to encapsulate the toroidal core 17 and form body 42, the toroidal core 17 is first clamped and held in place by pins 61 in an injection mold cavity 66. The injection mold cavity 66 is very effective and maintains the toroidal shape of the toroidal core 17. Molten phase-change material is then injected into the molding cavity 66 with an extrusion screw (not shown) until the pressure inside the cavity reaches a predetermined molding pressure. After injecting the molten phase change material, the pins 61 retract as shown in FIG. 6b. The phase change material is then allowed to cool and solidify into a monolithic body 42 that substantially encapsulates the toroidal core 17.

Figure 7:
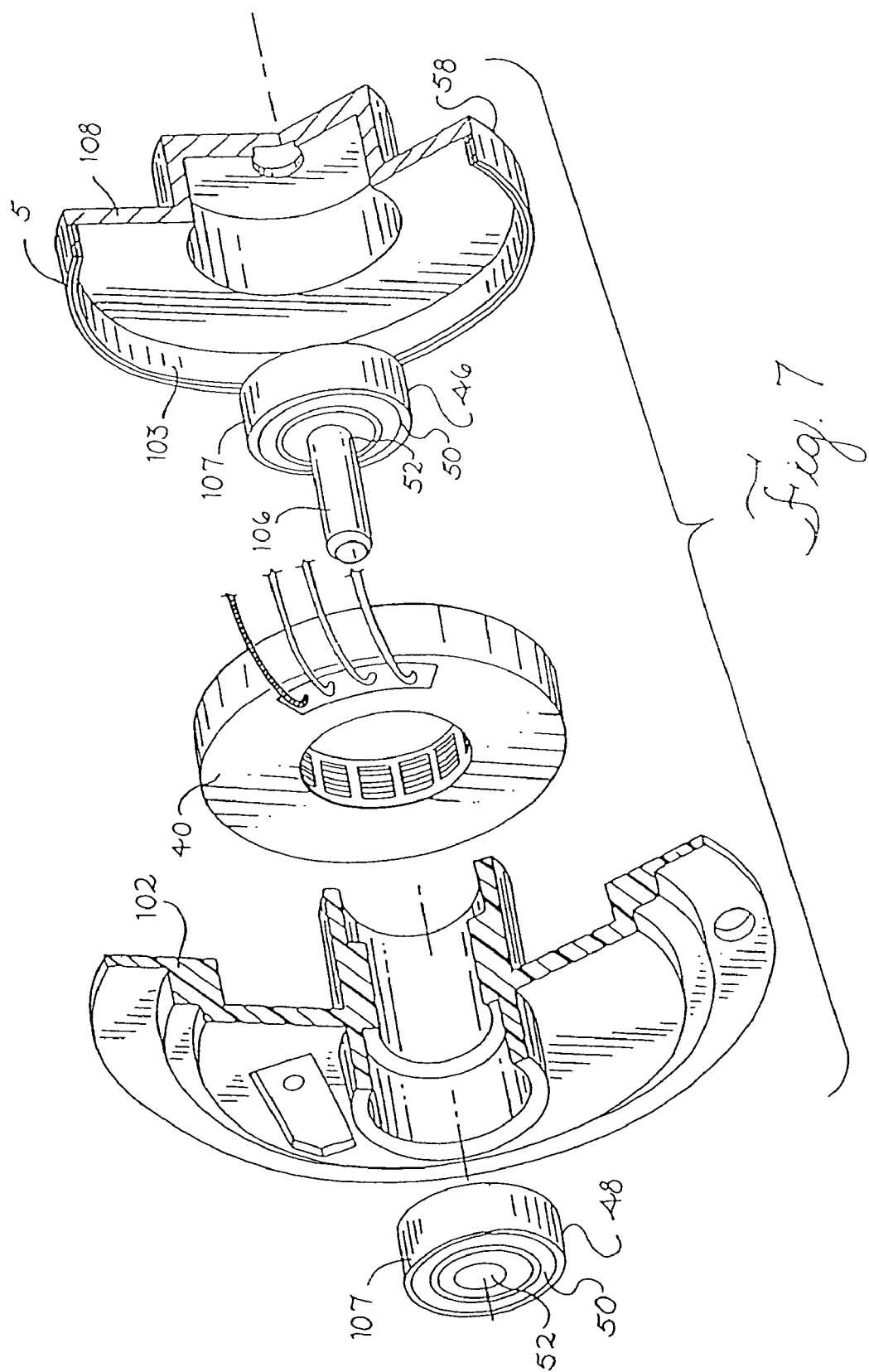
FIG. 7 is an exploded, partial cross-sectional and perspective view of a high speed motor using the encapsulated stator of FIG. 5.

The injection molded stator assembly 40 is then used to construct the rest of the spindle motor 100 (FIG. 7). The spindle motor 100 includes a hub 108, which serves as a disc support member, the stator assembly 40, a base 102, a shaft 106 and bearings 107.

As shown in FIG. 7, a shaft 106 is connected to the hub or disc support member 108 and is surrounded by bearings 107, which are adjacent against the base 102 of the motor. A rotor or magnet 103 is fixed to the inside of the hub 108 on a flange so as to be in operable proximity to the stator assembly. The magnet 103 is preferably a permanent magnet, as described below.

Referring to FIG. 7, the bearings 107 include an upper bearing 46 and a lower bearing 48. Also, each bearing 107 has an outer surface 50 and an inner surface 52. The outer surface 50 of the upper bearing contacts the hub 108 and the outer surface 50 of the lower bearing 48 contacts the lower support base 102. The inner surfaces 52 of the bearings 107 contact the shaft 116. The bearings are preferably annular shaped. The inner surfaces 52 of the bearings 107 may be press fit onto the shaft 16. A glue may also be used. The outer surface 50 of the bearings 107 may be press fit into the interior portion of the base 102. A glue may also be used. The bearings in the embodiment shown in FIG. 7 are ball bearings. Alternatively other types of bearings, such as hydrodynamic or combinations of hydrodynamic and magnetic bearings, may be used. The bearings are typically made of stainless steel.

The shaft 106 is concentrically disposed within the interior portion of the stator assembly 40 and the base 102. The bearings 107 surround portions of the shaft 106. As described above, the inner surfaces 52 of the bearings are in contact with the shaft 106. The shaft 106 includes a top portion 54 and a bottom portion 56. The top portion 54 of the shaft 106 is fixed to the hub 108. The bottom portion 54 of the shaft 106 is free to rotate inside the lower bearing. Thus, in this embodiment, the shaft 106 is freely rotatable relative to the base 102. The shaft 106 is preferably cylindrical shaped. The shaft 106 may be made of stainless steel.

Referring to FIG. 7, the hub 108 is concentrically disposed around the stator assembly 40 and the base 102. The hub 108 is fixed to the shaft 106 and is spaced apart from the stator assembly 40 and the base 102. The hub 108 includes a flux return ring 58 and the magnet 103. The flux return ring 58 is glued to the disc support member. The magnet 103 is glued to the hub 108. As shown in FIG. 7, the magnet 103 concentrically surrounds the stator assembly 40. In this embodiment the magnet 103 and stator assembly 40 are generally coplanar when the motor 100 is assembled.

The magnet 103 is preferably a sintered part and is one solid piece. The magnet 103 is placed in a magnetizer which puts a plurality of discrete North and South poles onto the magnet 103, dependant on the number of poles 21 on the toroidal core 17. The flux return ring 58 is preferably made of a magnetic steel. The hub is preferably made of aluminum. Also, the hub may be made of a magnetic material to replace the flux return ring. Other motor designs using an encapsulated stator that can be made by the present invention are disclosed in provisional U.S. patent application Ser. No. 60/171,817 filed Dec. 21, 1999, incorporated herein by reference.

Figure 8:
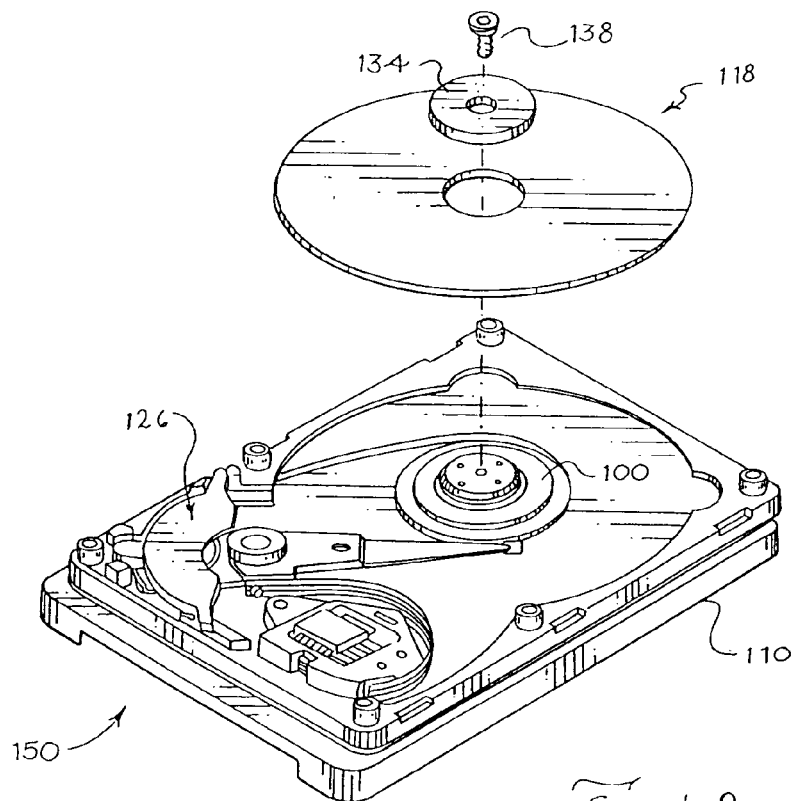
FIG. 8 is an exploded, partial cross-sectional and perspective view of a high speed motor and disc assembly made with the motor of FIG. 7.

The spindle motor described above can be part of a motor and disc assembly 150 as shown in FIG. 8. The disc assembly 150 has a disc stack assembly 118, spindle motor 100, and an actuator assembly 126. These subassemblies of the disc assembly are maintained in a precise relationship by precisely machined mounting positions on base 110.

Figure 9:
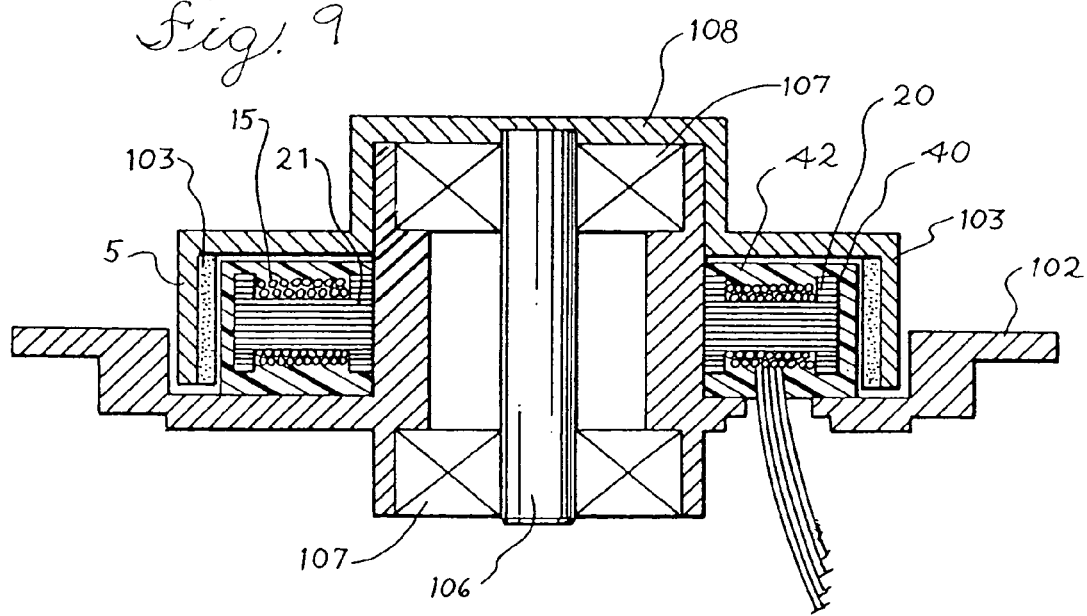
FIG. 9 is a cross-sectional view of the motor of FIG. 7.

The spindle motor 100 is mounted securely to the base 110, for example through mounting holes and matching bolts (not shown) located on the base 102 of spindle motor 100. Alternatively, spindle motor 100 may be adhesively mounted to base 110. Disc stack assembly is then mounted to spindle motor 100 through a disc clamp 134 through a mounting screw 138. The spindle motor 100, as shown in FIG. 9, has a hub 108, stator assembly 40 and base 102 that are mounted together using bearings 107 and axle 106.

ADVANTAGES OF THE PRESENT INVENTION

An advantageous feature of the present invention is provided by the fact that the stator assembly 40 is formed from a linear stator core preform 20 that is rolled to form a toroidal core 17 and substantially encapsulated with a monolithic body 42. Using a linear stator core preform 20 provides a uniform grain structure to the toroidal core 17. By using a linear stator core preform 20, a more uniform grain structure that is substantially transverse to the radius line of the toroidal core 17 may be obtained. The grain orientation of prior art circular stampings varies a great deal at different points around the circle. The grain orientation has an effect on the magnetic flux properties of the steel. By aligning the grain orientation, the magnetic flux is more uniform and the motor of the present invention has more consistent and uniform torque properties as it rotates. This also leads to greater motor efficiency and performance.

The preferred spindle motor 100 also has greater packing density of wire 15. In the disclosed embodiment of the invention, the toroidal core 17 is made of flat linear stator core preform 20. It should be understood that the disclosed method can use a stator piece that has some curvature. With circular stamped stators, there is a limitation of the spacing between each pole to allow the needle feeding the winding wire to enter and exit the gap. Additionally in small motors (less than 1.5 inches outer diameter), it is difficult to wind three phases of wire concurrently. Furthermore, this geometry makes the process of applying uniform, evenly spaced turns difficult to achieve. In this case, since a linear piece has all of the poles, there is more room to work, and a needle 35 feeding the winding wire 15 can thus pack the windings more tightly. The spool winder 34 also allows for this winding to be done more efficiently. Increasing the packing density of wire increases the magnetic field thereby providing more electromotive force and increased power to the motor. Furthermore, once the linear stator core preform 20 is rolled into a toroidal core 17, the gap between the poles decreases substantially. For example, if the gap between poles 21 in a linear stator core preform 20 is about 1 mm, the gap will be reduced to about 0.25 mm once the linear stator core preform is rolled. This subsequent decrease in the gap is important since a smaller gap between poles typically allows for increased motor performance.

The limited working space for winding wire 15 around the poles 21 in circular stamped stators limits the size of spindle motors as well. Since the disclosed method allows for increased working room, smaller motors may be made with the present method compared to prior art methods.

The disclosed spindle motor 100 minimizes stack up tolerances. Since, in the present embodiment, only linear pieces are used, the stamped linear pieces can be stamped from portions of the steel roll that is of consistent thickness. Thus the resulting stacked linear stator core preform 20 will have reduced stack up tolerances. Reducing the stack up tolerances optimizes dimensional consistency and thereby enables higher rotational speeds with lower vibration induced runout. Furthermore, since a linear stator piece 20 is used instead of circular stampings, the linear pieces can be more closely laid out when being stamped, reducing the amount of resulting scrap.

Further, in the prior art, to prevent a motor from seizing when it gets hot, larger than desired gaps between the magnet 3 and the stator assembly 4 were used so that when pieces expanded from being heated, the magnet would not contact the stator. If the magnet contacted the stator, the contact would generate magnetic particulate which can damage the heads and interfere with their ability to read or record data on the discs. Also, if the body has a CLTE greater than that of the steel laminations in the stator, the gap has to be large enough so that the expansion of the body as the motor heats up does not cause the body to contact the rotating magnet (even though the steel laminations are not close to contacting the magnet). With the preferred embodiment of the present invention, with the CLTE of the body matching that of the steel laminations, much smaller gaps, as low as 0.005 inches and more preferably as low as 0.003 inches, can be utilized. As the body 42 expands, it only expands at the same rate as the laminations, and does not grow to the point that the body diminishes the gap size to zero. Thus, the only gap that is needed is one sufficient for expansion of the steel laminations. These smaller gaps make the motor more efficient, as the electrical efficiency of the motor decreases with larger distances between the stator and the rotating magnet.

Through the use of the present embodiment, a particular plastic may be chosen for the body 42 that has properties of rockwell hardness, flex modulus, and elongation that are specifically designed to counteract the vibratory frequencies generated by the motor. Thus, the disclosed spindle motor substantially reduces motor vibration. This reduced vibration allows information on a disc to be stored closer together, thereby enabling higher data density.

The disclosed spindle motor 100 also reduces the emission of materials from the motor components onto the magnetic media or heads of the disc drive. This is achieved because components such as the stator, which potentially emit such materials, are substantially encapsulated in plastic.

In addition, the disclosed spindle motor 100 obviates the necessity of a separate plastic or rubber ring sometimes used to isolate the spindle motor from the hard drive in order to prevent shorts from being transferred to the magnetic media and ultimately the read-write heads. Because the disclosed spindle motor body 42 is preferably made of a non-electrically conductive (having a dielectric strength of at least 250 volts/mil) and injectable thermoplastic material, such a separate rubber isolating ring is unnecessary. Once again this reduces manufacturing costs and the stack up tolerances associated with using an additional part.

It is contemplated that numerous modifications may be made to the spindle motor and method for making the spindle motor of the present invention without departing from the spirit and scope of the invention as defined in the claims. For example, while the exemplary embodiment shown in the drawings has a flat linear stator piece, those skilled in the art will appreciate that the same method can be used to make stator assemblies with a linear stator piece that has some curvature. Furthermore, the body 42 can encapsulate more than just the toroidal core. The body 42 can also encapsulate the base 102 of the motor without departing from the scope of the invention. Accordingly, while the present invention has been described herein in relation to several embodiments, the foregoing disclosure is not intended or to be construed to limit the present invention or otherwise to exclude any such other embodiments, arrangements, variations, or modifications and equivalent arrangements. Rather, the present invention is limited only by the claims appended hereto and the equivalents thereof.

The invention claimed is:

1. A stator assembly comprising:
   a) a stator having multiple conductors that create a plurality of magnetic fields when electrical current is conducted through the conductors and a core having a pair of opposing end surfaces in contact with each other forming a toroidal shape; and
   b) a monolithic body of phase change material substantially encapsulating the conductors and the core and holding said core in a toroidal shape, the monolithic body of phase change material being the sole structure functioning to secure the core in the toroidal shape.

2. The stator assembly of claim 1 wherein the conductors comprise wire windings and the packing density of the wire is between about 60 percent and about 80 percent.

3. The stator assembly of claim 1 wherein the stator is made from metal laminations and the grain structure of the metal in each lamination is oriented in the same general direction.

4. The stator assembly of claim 3 wherein the phase change material has a coefficient of linear thermal expansion that is similar to the coefficient of linear thermal expansion for the metal laminations.

5. The stator assembly of claim 1 wherein the phase change material has a coefficient of linear thermal expansion of less than $2 \times 10^{-5}$ in/in° F. throughout the range of 0–250° F.

6. The stator assembly of claim 1 wherein the phase change material has a coefficient of linear thermal expansion of less than $1.5 \times 10^{-5}$ in/in° F. throughout the range of 0–250° F.

7. The stator assembly of claim 1 wherein the phase change material has a coefficient of linear thermal expansion of between about $0.8 \times 10^{-5}$ in/in° F. and about $1.2 \times 10^{-5}$ in/in° F. throughout the range of 0–250° F.

8. The stator assembly of claim 1 wherein the phase change material has a thermal conductivity of at least 0.7 watts/meters° K. at 23° C.

9. The stator assembly of claim 1 wherein the phase change material comprises polyphenyl sulfide.

10. A motor made from the stator assembly of claim 1.

11. The motor of claim 10 wherein said motor comprises a stator assembly, a shaft, a base, bearing, and a hub.

12. An electronic device having the motor of claim 10.

13. A motor and disc assembly having the motor made according to claim 10.

14. An encapsulated stator comprising:
   a) a stator having multiple conductors that create a plurality of magnetic fields when electrical current is conducted through the conductors and a core having a pair of opposing end surfaces in contact with each other forming a toroidal shape; and
   b) a monolithic body of phase change material substantially encapsulating the conductors and the core, the monolithic body of phase change material structurally functioning to secure the core in the toroidal shape.

15. The encapsulated stator of claim 14 wherein the monolithic body of phase change material has a tensile strength of at least about 7,600 psi when tested under ASTM test method D638.

16. The encapsulated stator of claim 14 wherein the phase change material has a coefficient of linear thermal expansion of less than $2 \times 10^{-5}$ in/in° F. throughout the range of 0–250° F.

17. The encapsulated stator of claim 14 wherein the phase change material has a thermal conductivity of at least 0.7 watts/meter° K. at 23° C.

18. The encapsulated stator of claim 14 wherein the phase change material is selected from the group consisting of thermoplastics and thermosetting materials.

19. The encapsulated stator of claim 14 wherein the phase change material is injection molded to substantially encapsulate the conductors and the core.

* * * * *